June 14, 1955

T. R. THOMAS 2,710,671

LUBRICANT PUMP

Filed Feb. 13, 1951

INVENTOR
Thomas R Thomas
BY
ATTORNEY

June 14, 1955  T. R. THOMAS  2,710,671
LUBRICANT PUMP
Filed Feb. 13, 1951  3 Sheets-Sheet 2
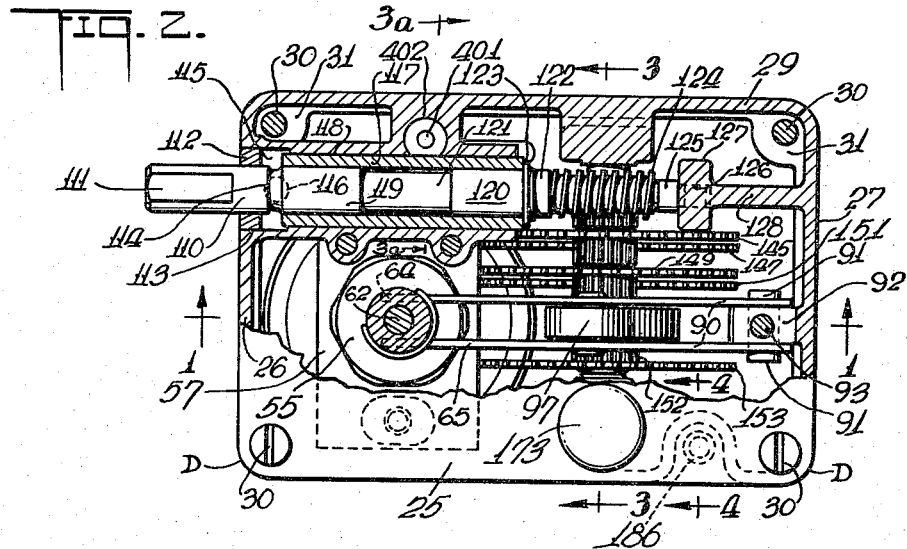
Fig. 2.
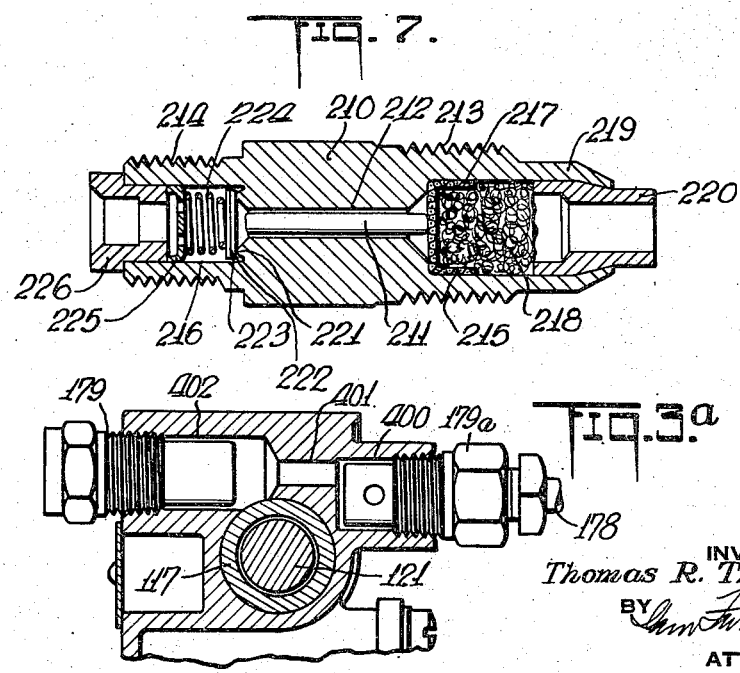
Fig. 7.
Fig. 3a.
INVENTOR
Thomas R. Thomas
BY
ATTORNEY

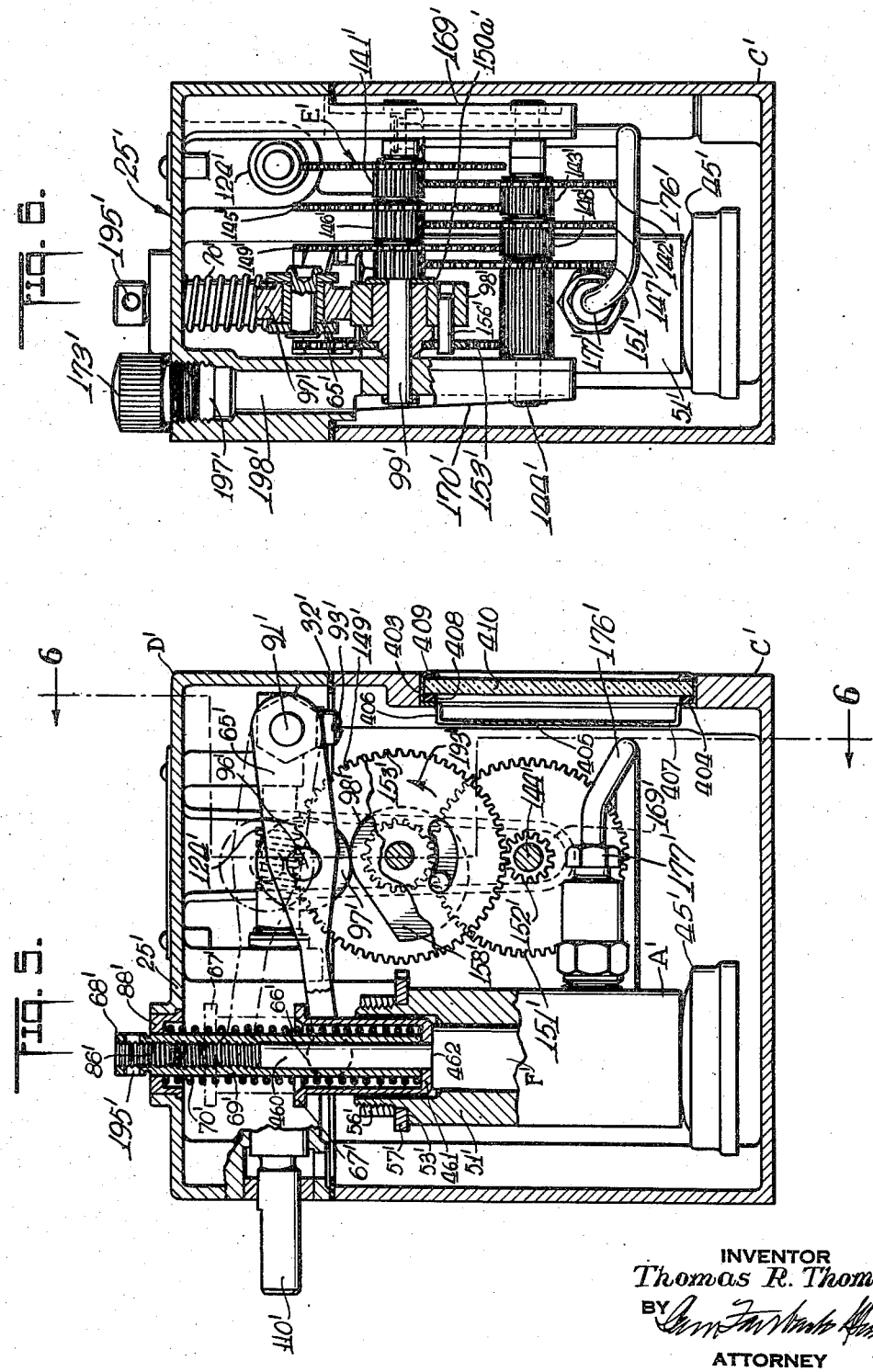

United States Patent Office 2,710,671
Patented June 14, 1955

2,710,671

LUBRICANT PUMP

Thomas R. Thomas, New York, N. Y., assignor to Auto Research Corporation, a corporation of Delaware Application February 13, 1951, Serial No. 210,727

9 Claims. (Cl. 184—27)

This invention relates to a lubricating system and it particularly relates to a centralized lubricating system.

Although not limited thereto, the present invention will be particularly described in its application to a centralized lubricating installation of the high restriction flow metering type in which a plurality of widely distributed and spaced bearings are to receive relatively small, yet accurately proportioned, quantities of lubricant during the operation of the mechanism being lubricated, which quantities will give sufficient and ample lubrication without overflow or excess lubricant on the machine regardless of the relative inaccessibility and accessibility of the bearings, varying climatic conditions and various temperatures that may cause changes in the viscosity of the lubricant, and the amount of operation of the machine.

In the preferred form of the present invention there is provided a central pump automatically actuated by the machine or associated mechanism to feed lubricant in a cyclic manner in accordance with the length and period of operation of the machine.

From this pump there extends a branched distributing conduit or piping system to a plurality of widely distributed bearings in or about the mechanism to be lubricated, whether it be an automotive chassis, a machine tool, a textile machine, a power press, a baking machine, an accounting machine and many other types of mechanisms and machines.

At the outlets of the system and adjacent to or directly on the bearings or connected to the bearings by tail pipes are high restriction flow metering fittings which may have inlet strainers, outlet check valves, preferably spring seated, and intermediate high restriction members which, in the preferred form, consist of pins closely fitting in a bore, both of accurately predetermined dimensions.

These high restriction flow metering fittings have an obstructing or restricting effect upon the flow of lubricant which is tremendously greater than that afforded by the piping or tubing system, even though quite elongated to the most remote bearing and also tremendously greater than the obstructing or restricting effect encountered in the bearings.

It is among the particular objects of the present invention to provide an improved, reliable pump or pressure unit for a central lubricating installation of the character described which will feed lubricant automatically to the branched distributing system at intervals, proportionate to extent of operation of the machine to give sufficient and ample lubrication without overflow or excess lubricant on the machine, without being affected by varying climatic conditions and various temperatures, and changes in the viscosity of the lubricant regardless of the amount of operation of the machine.

Another object is to provide a central pressure source automatically actuated by the machine or associated mechanism to feed lubricant in a cyclic manner to the bearings to be lubricated in accordance with the length and period of operation of the machine and requirements of the machine bearings.

Another object is to provide a compact, durable, reliable, central pump installation for a lubricating installation of the character described which will be automatically actuated by the mechanism being lubricated to supply the proper portions of lubricant thereto throughout the operation of the machine.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to one embodiment of the present invention, to provide a central reservoir which may take the form of a separate casing or which may take the form of a pocket in the machine being lubricated. The pump and driving mechanism preferably is assembled as a single unit with the cover of the reservoir or pocket serving to carry the depending reciprocating piston pump as well as the actuating mechanism.

In the preferred form of the invention, suspended from the cover of the mechanism will be a tubular member receiving a connecting rod. The tubular member may serve as a cylinder for a piston pump and may carry at its lower end a filter. The upper part of the piston is preferably provided with a connection to a reciprocatory arm, which at determined intervals will lift the piston or plunger, drawing in a charge of lubricant with springs causing return of such piston and forcing said lubricant into the external system.

Desirably an adjustment is provided at the top of the cover or at the top of the reservoir or pocket to permit regulation of the stroke of the plunger.

The pump is desirably actuated by a shaft mounted in the cover of the pump or reservoir. The bearing for the shaft is desirably lubricated from the pump and it carries a worm which in turn drives a gearing train to give a suitable reduction to a cam, which causes elevation of a lever acting upon the plunger.

Desirably the gearing train is positioned within the reservoir so that it will be directly lubricated by the lubricant therein and the shafts for the gearing train are mounted in the brackets depending from the cover and extending downwardly inside the reservoir casing or pocket.

The plunger is desirably elevated at a predetermined interval to draw in the charge of lubricant and then by a return spring the plunger is depressed, causing such lubricant to be forced under pressure into the external system.

Desirably the drive for the pump consists of a horizontal shaft in the cover of the reservoir or lubricant pocket which is driven by a connection from the machine being lubricated.

The driving shaft actuates a worm gear which in turn drives a series of intermeshing pinion and gear wheel assemblies positioned on parallel shafts carried by said brackets.

Adjustment means are provided for regulating the throw of the actuating lever and manual means are also provided to give optional operation of the plunger at intervals between predetermined pressure applications.

The driving mechanism is preferably positioned in oil-tight housings upon the cover, so that lubricant may be fed into the housings to lubricate the driving mechanism, with excess of lubricant flowing back into the reservoir.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 2 is a top plan view, partly in section, along the line 2—2 of Fig. 1, and upon the same scale as Fig. 1.

Fig. 3 is a vertical side sectional view taken upon the line 3—3 of Fig. 2.

Fig. 3a is a fragmentary transverse sectional view of the outlet passage from the pump at the cover upon the line 3a—3a of Fig. 2.

Fig. 4 is a fragmentary side view, partly in section, upon the line 4—4 of Fig. 2.

Fig. 5 is a side sectional view of an alternative pump construction similar to Fig. 1.

Fig. 6 is a transverse sectional view taken upon the line 6—6 of Fig. 5.

Fig. 7 is a longitudinal sectional view of a flow metering outlet which may be utilized in connection with the pressure sources of Figs. 1 to 5.

Figure 1:
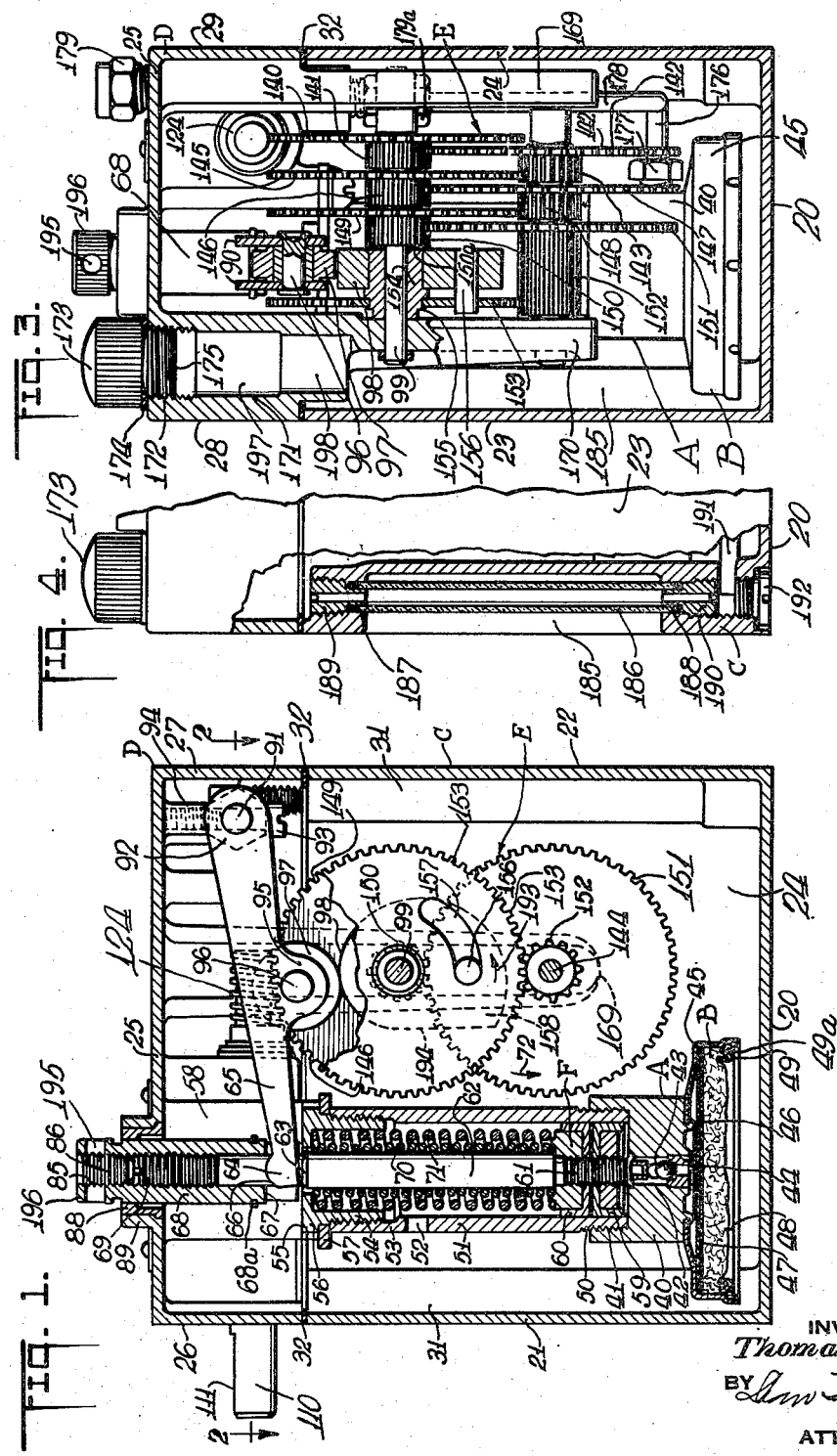
Fig. 1 is a transverse vertical sectional view of a pump construction according to the present invention, taken upon the line 1—1 of Fig. 2.

Referring to the embodiment of Figs. 1 to 4, the pump structure A has a filter structure B, a lower casing C for receiving the lubricant, a cover structure D, and a drive mechanism E.

The reservoir C is shown as a separate container, but it also may be formed as a recess or receptacle in the machine structure itself. The separate reservoir as shown in Figs. 1 and 2 has a base 20, side walls 21, 22, 23 and 24. The cover D has a top wall 25 and the side walls 26, 27, 28 and 29.

The corner screws or bolts 30 pass through the cover D and screw into the corner enlargements 31 to hold the cover D in position. A sealing gasket 32 is positioned between the cover D and the base casing C.

The pump structure A has a base 40 with an internally threaded portion 41 and a central bore 42 receiving the ball check 43. The ball check 43 is provided with a seat 44.

Attached to the bottom of the body 40 is the filter structure B consisting of a cup 45 attached at the lip 46 at the base of the element 40. The cup 45 holds in position a double filter screen 47. The double screens 47 act as a backing for the filter 48. The filter 48 is held in position by the clamp ring 49, which is retained in place by the split ring 49a.

Threaded into the tapped portion 41 is the lower threaded end 50 of the pump cylinder member 51 (see Fig. 1). The upper portion of the cylinder member 51 has a vent hole 52 and an internally threaded upper end portion 53 in which fits the depending threaded portion 54 of the sleeve element 55. The hole 52 will permit draining, back to the reservoir, of oil accumulating above the piston.

The sleeve element 55 has an enlarged head 56. The top of the cylinder 51 and the head 56 clamp together upon the horizontal frame structure 57. This structure 57 is mounted upon the cover D by the depending bracket members 58.

Within the cylinder 51 is positioned the double piston F (see Fig. 1) with downturned and upturned cups 59 and 60, respectively, which are clamped together on the lower threaded portion 61 of the connecting rod 62.

Within the cylinder 51 and abutting against the piston F at one end and the sleeve 55 at the other end are the two springs 70 and 71. The coils of the inner spring 70 are more closely spaced and wound in the opposite direction, and are of finer wire than the outer coil spring 71. These springs 70 and 71 tend to press the piston F downwardly in the direction 72.

The upper end of the connecting rod 62 is of reduced diameter at 63 to receive the clevis 64 of the oscillating lifter bar assembly 65. The clevis 64 has upper rounded contacting faces 66. The faces 66 ride against the lower edge 67 of the sleeve 68. The sleeve 68 is threaded upon the upper threaded end 69 of the connecting rod 62. The sleeve 68 is provided with a ring 68a to prevent it from being pulled out. The internal bore of the sleeve 68 is threaded at 85 and receives a lock screw 86. By loosening lock screw 86, adjustment sleeve 68 can be screwed upward to reduce the stroke of piston F, or screwed downward to increase the piston stroke, thus reducing or increasing oil discharge volume correspondingly, within limits of adjustment.

The transverse opening 195 in the head 196 of the sleeve 68 permits a rod to be inserted and to lift the piston F to give an additional manual stroke whenever desired. This will also permit filling of the tubing lines after initial installation of the lubricating equipment. The sleeve 68 reciprocates in the bearing member 88. The member 88 in turn is fitted in the nipple 89 projecting upwardly from the top wall 25 of the cover D.

The reciprocating double lever member 65 is provided with two side elements 90. The elements 90 are pivotally mounted on the pivot pin projections 91 of the spacer 92. The hexagonal spacer 92 is suspended by the bolt 93 from the tapped nipple 94 on the top wall 25 of the cover D.

The side plates 90 are provided with depending portions 95. The depending ears 95 carry the pivot pin 96 on which is mounted the roller 97. The roller 97 rides upon the cam 98. The cam 98 rides on the shaft 99 and turns with the gear 153.

The cam 98 is driven through the gear system best shown in Fig. 3 and by the external driving connection best shown in Fig. 2.

The shaft 110 has a flat 111 (see Fig. 2) and extends through the disc or annulus 112 fitted in the opening 113 in the wall 26 of the cover D. The shaft 110 is recessed at 114 where it fits in the chamber 115 in the cover D. Below the recess 114 is the opening 116 through which any lubricant received in the chamber 115 may flow into the reservoir C.

The porous bearing sleeve 117 is press fitted into the recess 118 in the cover D. The shaft 110 has two enlarged portions 119 and 120 with an intermediate recessed portion 121. The end 122 of the shaft 110 projects beyond the washer 123 and is provided with the worm thread 124, which bears against the stud 125 press fitted into the recess 126 in the enlargement 127 supported by the web 128 from the wall 27 of the cover.

As best shown in Fig. 3, the worm 124 drives the large gear 140. The gear 140 turns with the pinion 141 on the shaft 99. The pinion 141 drives the large gear 142. The gear 142 turns with the pinion 143 on the shaft 144. The large gear 145 meshes with and is driven by the pinion 143. The pinion 146 turns with the large gear 145 and in turn meshes with and drives the large gear 147. The large gear 147 turns with the pinion 148. The pinion 148 meshes with and drives the large gear 149.

The large gear 149 turns with the pinion 150. The pinion 150 drives the large gear 151. The large gear 151 turns with the elongated pinion 152.

The pinion 152 extends across the cam 98. At the other side of the cam 98, the pinion 152 meshes with and drives the large gear 153. The large gear 153 is fixed to the hub 154 by the peened-over portion 155. The hub 154 carries the cam 98 which is held in place by washer 150a. The cam 98 has an outstanding pin 156. The pin 156 rides in the arcuate slot 157 so that there will be free movement between the cam 98 and gear 153 after the roller 97 passes over the lobe 158. This will permit the springs 70 and 71 to rapidly or instantly drive the piston F downwardly after the roller 97 has passed over and beyond the lobe 158 and elevated the piston F to the top of its stroke against springs 70 and 71.

The shafts 99 and 144 for the gear train E have bearings in the brackets or arms 169 and 170, depending from the top 25 of the cover D. The cover D is also provided with a vertical well opening 171 which is threaded at 172 (see Fig. 3) to receive the closure 173 with the sealing gasket 174.

The closure 173 has a depending, threaded nipple 175 which closes off the top of the passage 171.

To the side of the pump body 40 (see Fig. 3) is connected the outlet tube 176 by the compression bushing 177. The tube 176 has a vertical extension 178 which leads to the inner outlet valve 179a in socket 400 (see Fig. 2). Passage 401 connects socket 400 with socket 402 in which the outer outlet valve 179 is located. Valve 179 connects with the tubing system of the machine bearings. The tube 176 conducts the lubricant through the vertical extension 138 to the outlet valves 179a and 179 to the outlet at the top of the cover D.

Socket 402 will feed lubricant to the bearing 117. The two valves 179 and 179a will trap oil in said socket 402.

The side of the reservoir base C is provided with a recess 185 in which is fitted the tubular sight glass 186. The tubular sight glass 186 fits in the openings 187 and 188, which are provided with sealing gaskets. The glass tube 186 is adjustably held in position by the threaded sleeves 189 and 190 in said openings 187 and 188.

The top threaded seleve 189 (see Fig. 4) communicates with the upper part of the reservoir C, while the lower threaded sleeve 190 communicates with the flow passage 191 which is sealed by the sealing screw 192. The removal of the sealing screw 192 permits access to the threaded sleeve 190 of the sight glass tube 186 and also permits draining of oil, if desired, from the reservoir C.

In Figs. 1 to 4 the entire driving mechanism E and the pump structure A as well as the piston structure F are all suspended from the cover by the depending bracket elements 169 and 170 and the tube 51 respectively.

In operation, the shaft 110 will be driven from a suitable rotary power source which may be a part of the machine to be lubricated. The bearing portions 119 and 120 of the shaft 110 will be lubricated from the pocket 402, the porous bearing sleeve 117, and the recess 121. The worm 124 will drive the train of gears shown best in Figs. 1 and 3, consisting of gear 140, pinion 141, gear 142, pinion 143, gear 145, pinion 146, gear 147, pinion 148, gear 149, pinion 150, gear 151, pinion 152 and gear 153.

Each of the pinions 141 to 152 are respectively integral or rigid with the preceding gears 142 to 151 so that they will turn together freely on the shafts 99 and 144. The shafts 99 and 144 having bearings in the depending brackets or arms 169 and 170 will be lubricated by the lubricant carried around by the gears 142, 147 and 151 as they dip into the lubricant in the lower part of the reservoir C. This lubricant will also be carried to the worm 124 by the gear 140 and to thrust bearing face of stud 125 in the enlargement 127 (see Fig. 2).

The cam 98 will turn with the gear 153, elevating the roller 97 and the twin arms 65. As the roller is elevated by movement of the cam 98 in the direction 193 (see Fig. 1), the pin 156 will locate at the left end of the slot.

As the arms 65 are elevated, they will elevate the sleeve 68, elevating the piston F, stressing the springs 70 and 71, and drawing in a charge of oil past the ball check 43. When the roller 97 is on the lobe 158 of the cam 98, the piston F will be in its uppermost position. As the roller 97 passes over the lobe 158, it will drop down over the surface 194 of the cam 98. The slot 157 receiving the pin 156 will permit the cam 98 to snap ahead with the pin 156 until pin 156 contacts the other end of the slot 157.

The springs 70 and 71 will then force the piston F downwardly discharging the lubricant through the tubing 176 and 178 into the dual outlet valves 179 and 179a. The position of the sleeve 68 upon the connecting rod 62 may be varied by loosening the lock screw or plug 86, inserting a tool in the transverse opening 195 in the head 196 of the sleeve 68, and turning the sleeve 68 to raise or lower it in respect to the connecting rod 62.

The frequency of the cycle is determined by the speed of the drive shaft 110 and by the reduction ratios of the gearing combinations of the pinions and gears 141 to 153, by omitting them in pairs, and at the same time lengthening pinion 152 to maintain proper mesh of gear train. With suitable drive shaft the direction of drive may be clockwise or counter-clockwise.

By removing the cap 173, lubricant may be readily fed into the passages 197 and 198 into the interior of the reservoir C.

If it is desired to repair or replace the driving mechanism E, or the pump A or filter B or associated mechanisms, the bolts or screws 30 may be removed and the cover D lifted, which will elevate the entire driving mechanism E.

The discharge of the pump A supplies lubricant to the metering outlet fittings, such as shown in Fig. 8. This fitting has a body 210 with a central, accurately dimensioned bore 212 substantially completely filled by a pin 211. The ends of body 210 are reduced in diameter and threaded, as indicated at 213 and 214. The body 210 is also provided with the inlet pocket 215 and the outlet pocket 216. The inlet pocket receives the strainer cup 217 and the filter or fibrous strainer 218. The end of the fitting 210 is peened over at 219 to hold an extension on sleeve 220 in position.

The thread 213 is normally screwed into a junction to receive the lubricant under pressure from the pump of Figs. 1 to 4.

The outlet pocket 216 has a valve seat 221 which contacts the valve face 222, which may be of oil silk, vinylite resin or a silicone rubber and may feed into a tail tube or pipe of small diameter.

The valve disc backing 223 is acted upon by the barrel spring 224 which acts against the spring retainer 225. The spring retainer 225 is held in position by the coupling sleeve 226, which is designed to be coupled to a small diameter tube leading to the bearing to be lubricated.

The pump A of Figs. 1 to 4 will maintain a sufficiently high pressure to overcome any drop in pressure through the junctions and distributing lines.

The flow metering outlet fittings 210 will afford such a high obstructing effect that they in themselves, regardless of varying levels of bearings, varying lengths of distributing conduit and varying resistance in the bearings, will in themselves predominately determine the distribution of lubricant.

In the alternative pump construction of Figs. 5 and 6, corresponding functioning parts are indicated by the same numerals and letters as in Figs. 1 to 4, except such numerals are primed.

Referring to Figs. 5 and 6, the piston F' is shown as an elongated unpacked metal plunger fitting in the cylinder sleeve 51'. The supporting bracket 57' is clamped between the shoulder 53' of the sleeve 51' and the nut 56'.

Attached to the top of the piston F' is a reduced diameter extension 460 encircled by the internally threaded sleeve 68'. A single spring 70' encircles the sleeve 68' and reacts against the insert 88' on the top 25' of the cover D'.

The double lever 65' has double, circular contact elements 66', which act on the flange 67' of the cup 461. The bottom of the cup 461 abuts the shoulder 462 on the plunger F'.

The plunger F' is pressed downwardly by the spring 70'. The position of the sleeve 68' on the reduced portion 460 of the plunger F' will determine the stroke and may be adjusted by loosening the lock plug 86' and turning the sleeve 68' in respect to the threaded portion 69' of the plunger extension 460.

The drive is through the shaft 110', the worm 124' and the gear train E', as indicated in Figs. 1 to 4.

The reservoir C' is provided with an opening 403 (see Fig. 5) in which is press-fitted the cup 404. The bottom 405 of the cup 404 is provided with the flow openings 406 and 407 and holds the transparent plastic or glass disc 410. The disc 410 is provided with a lubricant tight connection by the gasket 408 and the inturned front portion of the cup 409.

Where there has been herein described a preferred form of the invention, it should be understood that the same may be altered in details and in relative arrangement of parts within the scope of the appended claims.

Pivot 91 of the bar 65 is adjustably suspended by the bolt connection 93 and the location of the pivot of the bar 65 may thus be changed. At the other end, by adjustment of the lock screw 86 the adjustment sleeve 68 may be moved to change the movement of the forward or piston end of the bar 65.

The groove below the head 196 permits a tool to be inserted and the piston F to be lifted by hand when a manual stroke is desired. The slot 157 shown in the gear wheel 153 will permit a down stroke by the piston F without interference with the cam 98.

Having now particularly described and ascertained the nature of the invention, and in what manner the same is to be performed, what is claimed is:

1. A central spring-returned, reciprocating double cup plunger metering pump of the type having a rectangular reservoir casing with an inverted rectangular cup cover having on the top thereof adjustment means and manual actuating means for the plunger stroke, an outlet fitting and a filler opening, and having inside of the cup enclosure of the cover a bracket depending from the underside of the cover, a cylinder-plunger combination, the cylinder of which is supported on and depends from the lower end of said bracket, a horizontal transverse drive shaft with bearing members mounted on the inside lower face of said cover, depending structural members extending downwardly from and attached to the inside and bottom of said cover, superimposed parallel horizontal spaced shafts extending between and bearing at their ends in said structural members and having a plurality of contacting intermeshing pinion and gear units serving as a reduction gearing train, said train being driven from said drive shaft and driving said plunger, and a cam and lever drive connection between the gearing train and the plunger, the first pinion gear unit of said train having a worm gear drive connection to said drive shaft and the last pinion gear unit of said train having a pin and slot lost motion connection to said cam and lever drive connection.

2. The pump of claim 1, said adjustment means including vertical threaded rods extending transversely to and through said cover for adjusting the position of both ends of the lever of said cam and lever drive.

3. The pump of claim 1, said manually actuated means consisting of a threaded extension from said pump plunger extending upwardly through said cover and a slot to permit insertion of a lifting tool.

4. The pump of claim 1, said drive shaft having a porous bushing sleeve in said bearing members and a flow connection between said pump cylinder and the outside of said bushing sleeve to lubricate said drive shaft bearing members.

5. The pump of claim 1, said double spring consisting of two springs concentrically arranged extending between the plunger and the cover and positioned between the plunger and the cylinder to maintain a discharge pressure upon the discharge stroke of the plunger.

6. A central lubricant pump for a centralized branched lubricating installation having a cup-shaped lubricant reservoir casing devoid of mechanism, a cover for said casing, a drive shaft for said pump mounted on said cover and extending horizontally through said cover and a reciprocating piston-cylinder combination depending downwardly from said cover, a suspension structure mounted at its upper end on the cover and at its lower end supporting said piston-cylinder combination at the bottom of the lubricant reservoir casing so that it will be immersed in the lubricant body, said pump being characterized by a piston actuator mechanism having a reduction gear train with parallel vertically superimposed horizontal shafts, the axes of which are positioned in the same vertical plane, said train being driven by said drive shaft and in turn driving said piston, said train having intermeshing gear wheel and pinion reduction units alternately carried on said superimposed shafts and the ends of said shafts being carried by vertically depending spaced structural arms extending downwardly from the cover and mounted at opposite sides of a second vertical plane through the cylinder-piston combination with said second vertical plane being perpendicular to the first mentioned vertical plane.

7. The pump of claim 6 in which said piston-cylinder combination has a threaded stroke adjustment at the cover, said adjustment consisting of a threaded connection extending upwardly from the piston through and to above the cover, having an upper threaded end portion and an adjustable threaded sleeve on said end portion, said gear having a cam and follower lever to act upon and lift the lower end of said sleeve.

8. The pump of claim 6 in which the gear train has a lost motion cam and follower connection to intermittently lift the piston in the cylinder and permit it to return under spring pressure.

9. The pump of claim 6 in which one of said depending structural arms is provided with a vertical opening at the upper end thereof constituting an inlet to fill the reservoir.

References Cited in the file of this patent

UNITED STATES PATENTS

| 1,465,120 | Fair | Aug. 14, 1923 |
| 1,803,456 | Atwood | May 5, 1931 |
| 1,912,240 | Zerk | May 30, 1933 |
| 1,976,493 | Griffith | Oct. 9, 1934 |
| 1,979,247 | Bijur | Nov. 6, 1934 |
| 1,998,439 | Bijur | Apr. 23, 1935 |
| 2,145,245 | Bijur | Jan. 31, 1939 |
| 2,245,860 | Hunting | June 17, 1941 |
| 2,278,452 | Kocher | Apr. 7, 1942 |
| 2,308,815 | Kocher | Jan. 19, 1943 |

FOREIGN PATENTS

| 162,188 | Great Britain | Apr. 28, 1921 |